US012779572B2

(12) United States Patent
Dunahoo et al.

(10) Patent No.: US 12,779,572 B2
(45) Date of Patent: Nov. 3, 2026

(54) SYSTEMS AND METHODS FOR CONTROL OF WELDING PARAMETER COMMAND VALUE LIMITS

(71) Applicant: Illinois Tool Works Inc., Glenview, IL (US)

(72) Inventors: Jason Dunahoo, De Pere, WI (US); Caleb Rosera, Glenview, IL (US)

(73) Assignee: Illinois Tool Works Inc.

( * ) Notice: Subject to any disclaimer, the term of this patent is extended or adjusted under 35 U.S.C. 154(b) by 860 days.

(21) Appl. No.: 17/182,644

(22) Filed: Feb. 23, 2021

(65) Prior Publication Data

US 2021/0299777 A1 Sep. 30, 2021

Related U.S. Application Data

(60) Provisional application No. 63/002,000, filed on Mar. 30, 2020.

(51) Int. Cl.
*B23K 9/095* (2006.01)
*B23K 9/10* (2006.01)

(52) U.S. Cl.
CPC .......... *B23K 9/0953* (2013.01); *B23K 9/0956* (2013.01); *B23K 9/1062* (2013.01); *B23K 9/1087* (2013.01)

(58) Field of Classification Search
CPC .......... B23K 9/09; B23K 9/092; B23K 9/093; B23K 9/095; B23K 9/0956; B23K 9/10; B23K 9/1087
See application file for complete search history.

(56) References Cited

U.S. PATENT DOCUMENTS

| | | | | |
|---|---|---|---|---|
| 4,721,947 | A | 1/1988 | Brown | |
| 8,115,138 | B2 * | 2/2012 | Jacovetty | B23K 9/1062 700/212 |
| 2009/0173726 | A1 * | 7/2009 | Davidson | G05B 19/40937 219/130.01 |

(Continued)

FOREIGN PATENT DOCUMENTS

| | | |
|---|---|---|
| EP | 3808495 | 4/2021 |
| JP | H11345056 | 12/1999 |

OTHER PUBLICATIONS

European Office Communication with Search Report Appln No. 21164453.9 dated Sep. 8, 2021.

(Continued)

*Primary Examiner* — Thien S Tran
(74) *Attorney, Agent, or Firm* — MCANDREWS HELD & MALLOY LTD.

(57) ABSTRACT

Disclosed example power supplies, user interfaces, and methods are provided for inputting and/or receiving upper and lower command value limits for a plurality of welding parameters associated with a welding power source and/or wire feeder. In some examples, the upper and lower command value limits correspond to an operating range of a respective welding parameter, such that a welding parameter command value is bound by the upper and lower command value limits in a lock mode during a welding operation. The upper and lower command value limits are set such that any change in a welding parameter value (e.g., an output value) during a welding operation is bound by the upper and lower command value limits when a lock mode is active.

20 Claims, 7 Drawing Sheets

(56) References Cited

U.S. PATENT DOCUMENTS

| | | | | |
|---|---|---|---|---|
| 2011/0049116 | A1* | 3/2011 | Rappl | B23K 9/1087 219/132 |
| 2011/0198329 | A1* | 8/2011 | Davidson | B23K 9/16 219/136 |
| 2014/0048522 | A1* | 2/2014 | Dina | B23K 9/1087 219/132 |
| 2014/0061169 | A1* | 3/2014 | Sammons | B23K 9/1006 219/109 |
| 2014/0251969 | A1 | 9/2014 | Stoner et al. | |
| 2017/0050256 | A1* | 2/2017 | Enyedy | B23K 9/1006 |
| 2017/0165775 | A1* | 6/2017 | Knoener | B23K 9/1006 |
| 2018/0036824 | A1* | 2/2018 | Peters | B23K 9/1062 |
| 2018/0095640 | A1* | 4/2018 | Albright | G06F 3/04847 |
| 2019/0070689 | A1 | 3/2019 | Bunker | |
| 2019/0146665 | A1* | 5/2019 | Evans | B23K 9/1062 715/771 |

OTHER PUBLICATIONS

European Office Communication wAppln No. 21164453.9 dated Aug. 9, 2022.

* cited by examiner

SYSTEMS AND METHODS FOR CONTROL OF WELDING PARAMETER COMMAND VALUE LIMITS

CROSS-REFERENCE TO RELATED APPLICATIONS

This application hereby claims priority to and the benefit of U.S. Provisional Application Ser. No. 63/002,000, entitled "SYSTEMS AND METHODS FOR CONTROL OF WELDING PARAMETER COMMAND VALUE LIMITS," filed Mar. 30, 2020. U.S. Provisional Application Ser. No. 63/002,000 is hereby incorporated by reference in its entirety for all purposes.

BACKGROUND

A common metal welding technique employs the heat generated by electrical arcing to transition a work piece to a molten state to facilitate a welding process. One technique that employs this arcing principle is wire feed welding. If the welding device is properly adjusted, the wire feed advancement and arcing cycle progress smoothly providing a good weld.

Traditionally during a welding operation, an operator selects the level and types of resources provided to the weld location, depending on the particulars of the weld and the materials being welded. Different kinds of wire electrode, however, perform well at different operational settings of the welding device.

Conventionally, welding outputs may vary widely during a welding operation. If the operator does not continually monitor and/or adjust the outputs during the operation, the weld quality may suffer.

SUMMARY

Disclosed example power supplies, user interfaces, and methods are provided for control of welding parameter command value limits. The disclosed systems and methods provide tools (e.g., a user interface, a welding schedule, a network interface, etc.) for inputting and/or receiving upper and lower command value limits for a plurality of welding parameters associated with a welding power source and/or wire feeder. The upper and lower command value limits correspond to an operating range of a respective welding parameter, such that a welding parameter command value is bound by the upper and lower command value limits in a lock mode during a welding operation.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Where appropriate, similar or identical reference numbers are used to refer to similar or identical components.

DETAILED DESCRIPTION

Figure 1A:
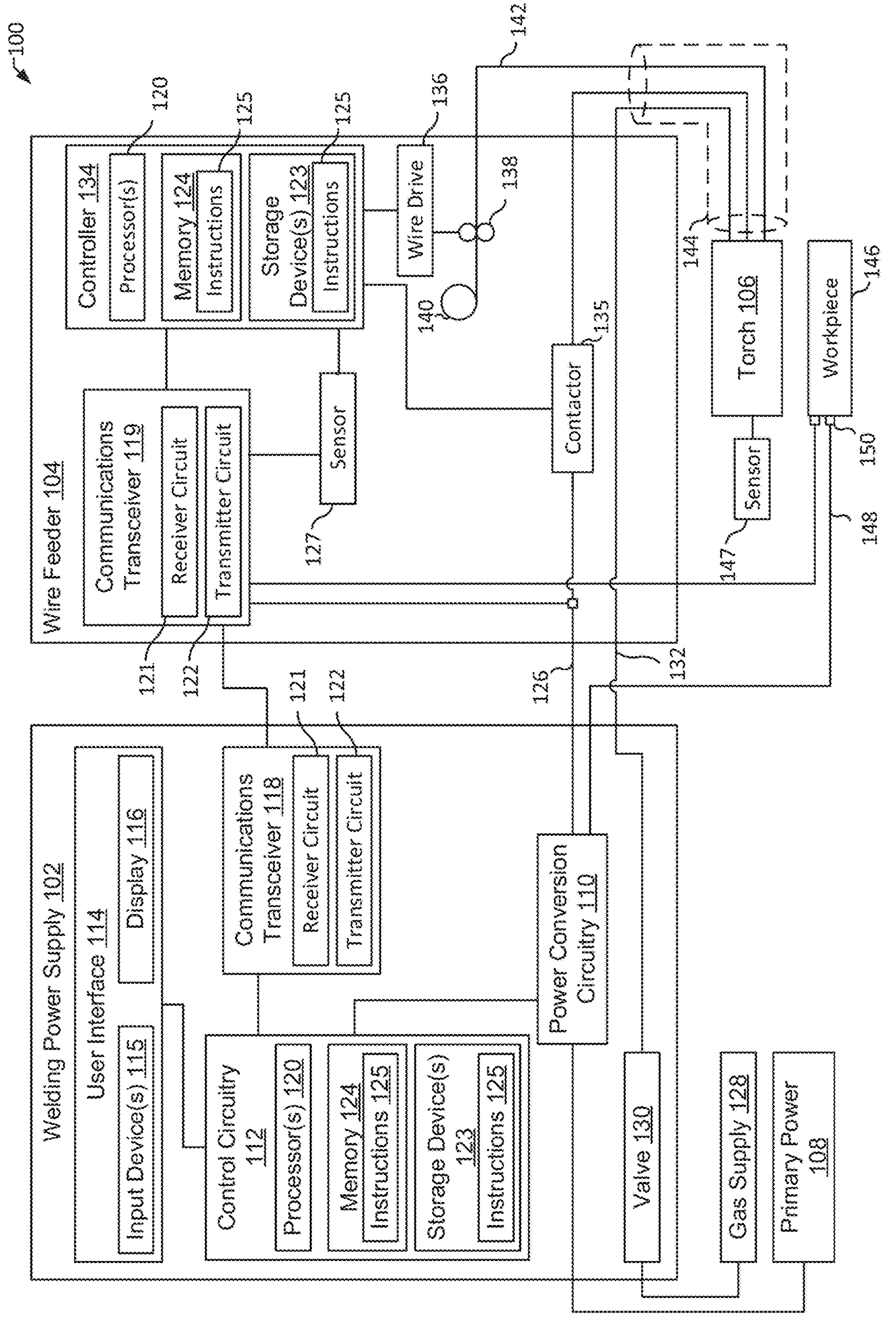
FIG. 1A is a schematic diagram of an example welding system including a power supply having a user interface to implement automatic control of welding parameter command value ranges, in accordance with aspects of this disclosure.

Disclosed example power supplies, user interfaces, and methods provide for inputting and/or receiving upper and lower command value limits for a plurality of welding parameters associated with a welding power source and/or wire feeder. In some examples, the upper and lower command value limits correspond to a range of command values for a respective welding parameter, such that a commanded (e.g., target or designated output value) welding value is bound by the upper and lower command value limits in a lock mode during a welding operation. The upper and lower command value limits are set such that any change to the commanded welding parameter value (e.g., a target output value) is bound by the upper and lower command value limits when a lock mode is active.

For example, when operating in a lock mode, welding parameter command values are selected as upper and lower command value limits. Thus, an operator cannot manually adjust a target value of a welding parameter to exceed or fall below a selected upper or lower command value limit, respectively, nor could a welding schedule control a welding parameter command value to go above or below the selected limits.

In some examples, an operator can employ a user interface to set, activate or deactivate the lock mode. The lock mode may be activated to lock all designated limits (e.g., both upper and lower command value limits for multiple welding parameters), or may selectively lock one or more designated limits (e.g., one or more of the upper and lower command value limits for one or more of the first or second welding parameter). Thus, during a welding operation, the control circuitry maintains each welding command parameter value to operate in accordance with the one or more locked limits.

In some examples, the user interface includes one or more of a knob, a touchscreen panel, or a dial, which can be used to set, activate or deactivate the limit values. In some examples, the upper and/or lower limit values can be provided from a welding schedule (stored in memory and/or provided via a network), and/or a remote computer device.

In some examples, upper and lower command value limits may be calculated based on one or more inputs other than a selection of a specific welding parameter values. For instance, the control circuitry may calculate an upper limit or a lower limit of the first or second welding parameter based on one or more welding parameters, such as, but not limited to, voltage, current, power, wire feed speed, gas flow rate, pulse rate, workpiece thickness, workpiece material type, workpiece geometry, electrode type, welding process, travel speed, arc length, arc control, joint type, type of welding tool being employed, type of weld being performed (e.g., upper and/or lower voltage limits may be calculated based on a wire feed speed and/or upper and/or lower limits of wire feed speed).

The systems and methods disclosed herein can be implemented on one or more components of a welding system (e.g., a welding-type power supply). The welding system component may include a graphical user interface (GUI) that includes a first graphical interface representing a first welding parameter (e.g., a voltage), and a second graphical interface representing a second welding parameter (e.g., wire feed speed). The control circuitry may be configured to receive data corresponding to a range of command values for one of the first or second welding parameter, each range of command values having an upper limit and/or a lower limit. In some examples, each graphical interface can include a graphical band, which provides a visual representation of both the operating range (e.g., within the upper and lower command value limit) as well as values or ranges outside of the operating range (e.g., corresponding to an available range of command values for the particular welding parameter).

Advantageously, the systems and methods disclosed herein provide easy setting and identification tools and techniques for upper and lower command value limits and locks thereof. The graphical user interfaces can employ a variety of indicators, such as color schemes. Further, one or more menu driven selection devices (e.g., via a welding power supply and/or computing platform providing a user interface from which to modify and/or select a menu or menu item) and methodologies are employed for setting command value limits to provide an allowable adjustment range.

In disclosed examples, a welding-type system includes a welding-type power supply; a graphical user interface (GUI) that includes a graphical interface representing a welding parameter; and a control circuitry configured to receive data corresponding to a range of command values for the welding parameter, the range of command values having an upper limit or a lower limit; generate a graphical band representing the range of command values for the welding parameter; and control the welding-type power supply to maintain a command value within the range of command values when in a lock mode.

In some examples, a user interface is to set, activate or deactivate the upper limit or the lower limit value associated with the graphical band of the welding parameter.

In some examples, a user interface is to set, activate or deactivate the lock mode for the welding parameter.

In some examples, the lock mode corresponds to the upper limit or the lower limit for the range of command values corresponding to the welding parameter, wherein each respective upper limit and lower limit values are configured to be activated or deactivated independently.

In some examples, the control circuitry is further configured to receive one or more particular welding parameters; and calculate an upper limit or a lower limit value of the welding parameter based on one of the particular welding parameters.

In some examples, the control circuitry is further configured to display values corresponding to the upper limit or the lower limit of the range of command values for the welding parameter. In examples, the control circuitry is further configured to generate an alert when the command value comes within a threshold level of the upper limit or the lower limit for the welding parameter.

In some examples, a user interface to adjust the range of command values for the welding parameter. In examples, a user interface is a selector knob or a touch screen.

In some examples, a user interface is to set, activate or deactivate the upper limit or the lower limit associated with the range of command values of the welding parameter.

In disclosed examples, a welding-type system includes a welding-type power supply; a graphical user interface (GUI) that includes a first graphical interface representing a first welding parameter, and a second graphical interface representing a second welding parameter; and a control circuitry configured to: receive data corresponding to an upper command value limit or a lower command value limit associated with the first welding parameter or the second welding parameter; receive, via a user interface, a command to activate or deactivate a lock mode for the upper command value limit or the lower command value limit for the first or second welding parameter; generate a first graphical band representing a range of command values for the first welding parameter between the corresponding upper and lower command value limits; generate a second graphical band representing a range of command values for the second welding parameter between the corresponding upper and lower command value limits; and control the welding-type power supply to maintain the first command value or the second command value within the respective range of command values when in the lock mode.

In some examples, the control circuitry is further configured to: receive data from one or more sensors corresponding to first and second command values for each of the first and second welding parameters, respectively; display a first marker on the first graphical interface representing the first command value; and display a second marker on the second graphical interface representing the second command value.

In some examples, each graphical interface further comprises a numerical value corresponding to the first and second command values. In examples, the first welding parameter is one or more of a voltage or arc length. In examples, the second welding parameter is one or more of a wire feed speed or amperage.

In some examples, the control circuitry is further configured to display a first characteristic on the first or second graphical band. In examples, portions of each graphical interface displays a graphical operating range corresponding to the operating range of the respective welding parameter, wherein portions of the graphical operating range outside the respective graphical band is displayed with a second characteristic. In examples, the first or second characteristic comprises one of a color, an intensity, a shape, a size, or a pattern. In some examples, the first characteristic is a first color and the second characteristic is a second color.

In disclosed examples, a welding-type system includes a welding-type power supply; a graphical user interface (GUI) that includes a first graphical interface representing a first welding parameter, and a second graphical interface representing a second welding parameter; and a control circuitry configured to: receive, via a menu driven selection device, data corresponding to an upper command value limit or a lower command value limit associated with the first welding parameter or the second welding parameter; receive, via the menu driven selection device, a command to activate or deactivate a lock mode for the upper command value limit or the lower command value limit for the first or second welding parameter; generate a first graphical band representing a range of command values for the first welding parameter between the corresponding upper and lower command value limits; generate a second graphical band representing a range of command values for the second welding parameter between the corresponding upper and lower command value limits; and control the welding-type power supply to maintain the first command value or the second command value within the respective range of command values when in the lock mode.

As used herein, "power conversion circuitry" and/or "power conversion circuits" refer to circuitry and/or electrical components that convert electrical power from one or more first forms (e.g., power output by a generator) to one or more second forms having any combination of voltage, current, frequency, and/or response characteristics. The power conversion circuitry may include safety circuitry, output selection circuitry, measurement and/or control circuitry, and/or any other circuits to provide appropriate features.

As used herein, the terms "first" and "second" may be used to enumerate different components or elements of the same type, and do not necessarily imply any particular order.

The term "welding-type system," as used herein, includes any device capable of supplying power suitable for welding, plasma cutting, induction heating, Carbon Arc Cutting-Air (e.g., CAC-A), and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller, and are used to control a welding process, a device such as a power source or wire feeder, and/or any other type of welding-related system.

As used herein, the term "memory" includes volatile and non-volatile memory devices and/or other storage device.

As used herein, the term "torch," "welding torch," "welding tool" or "welding-type tool" refers to a device configured to be manipulated to perform a welding-related task, and can include a hand-held welding torch, robotic welding torch, gun, gouging tool, cutting tool, or other device used to implement a welding process.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW, e.g., TIG), shielded metal arc welding (SMAW), spray, short circuit, CAC-A, gouging process, plasma cutting, cutting process, and/or any other type of welding process.

As used herein, the term "welding program" or "weld program" includes at least a set of welding parameters for controlling a weld. A welding program may further include other software, algorithms, processes, or other logic to control one or more welding-type devices to perform a weld.

Turning now to the drawings, FIG. 1A is a block diagram of an example welding system 100 having a welding-type power supply 102, a wire feeder 104, and a welding torch 106. The welding system 100 powers, controls, and supplies consumables to a welding application for intuitive setup for configurable and/or default settings for the power supply 102 and/or wire feeder 104. In other words, one or more input devices (such as a user interface, selector switch, knob, touchscreen input) receives an input from the operator relating to a desired change in a value of the one or more welding parameters, to designate and upper and/or lower limit value of one or more welding parameters. Once limits have been designated, another input device can be engaged to set, activate or deactivate a lock mode. In some examples, a separate technique may be applied to a previously used input device, such as a double tapping gesture, which indicates an instruction for the lock mode.

In some examples, the power supply 102 directly supplies input power to the welding torch 106. The welding torch 106 may be a torch configured for shielded metal arc welding (SMAW, or stick welding), gas tungsten arc welding (GTAW, or tungsten inert gas (TIG)) welding, gas metal arc welding (GMAW), or flux cored arc welding (FCAW), based on the desired welding application. In the illustrated example, the power supply 102 is configured to supply power to the wire feeder 104, and the wire feeder 104 may be configured to route the input power to the welding torch 106. In addition to supplying an input power, the wire feeder 104 may supply a filler metal to a welding torch 106 for various welding applications (e.g., GMAW welding, flux core arc welding (FCAW)). While the example system 100 of FIG. 1A includes a wire feeder 104 (e.g., for GMAW or FCAW welding), the wire feeder 104 may be replaced by any other type of remote accessory device, such as a stick welding and/or GTAW welding remote control interface that provides stick and/or GTAW welding The power supply 102 receives primary power 108 (e.g., from the AC power grid, an engine/generator set, a battery, or other energy generating or storage devices, or a combination thereof), conditions the primary power, and provides an output power to one or more welding devices in accordance with demands of the system 100. The primary power 108 may be supplied from an offsite location (e.g., the primary power may originate from the power grid). The power supply 102 includes power conversion circuitry 110, which may include transformers, rectifiers, switches, and so forth, capable of converting the AC input power to AC and/or DC output power as dictated by the demands of the system 100 (e.g., particular welding processes and regimes). The power conversion circuitry 110 converts input power (e.g., the primary power 108) to welding-type power based on a weld voltage setpoint (e.g., upper and/or lower limit values) and commanded outputs of the welding-type power via a weld circuit.

In some examples, the power conversion circuitry 110 is configured to convert the primary power 108 to both welding-type power and auxiliary power outputs. However, in other examples, the power conversion circuitry 110 is adapted to convert primary power only to a weld power output, and a separate auxiliary converter 111 is provided to convert primary power to auxiliary power. In some other examples, the power supply 102 receives a converted auxiliary power output directly from a wall outlet. Any suitable power conversion system or mechanism may be employed by the power supply 102 to generate and supply both weld and auxiliary power.

The power supply 102 includes a control circuitry 112 to control the operation of the power supply 102. The power supply 102 also includes a user interface 114. The control circuitry 112 receives input from the user interface 114, through which a user may designate upper and/or lower limit values, engage a lock mode, choose a process and/or input desired parameters (e.g., voltages, currents, particular pulsed or non-pulsed welding regimes, and so forth). The user interface 114 may receive inputs using one or more input devices 115, such as via a keypad, keyboard, physical buttons, a touch screen (e.g., software buttons), a voice activation system, a wireless device, etc. Furthermore, the control circuitry 112 controls operating parameters based on input by the user as well as based on other current operating parameters. Specifically, the user interface 114 may include a display 116 for presenting, showing, or indicating, information to an operator. The control circuitry 112 may also include interface circuitry for communicating data to other devices in the system 100, such as the wire feeder 104. For example, in some situations, the power supply 102 wirelessly communicates with other welding devices within the welding system 100. Further, in some situations, the power supply 102 communicates with other welding devices using a wired connection, such as by using a network interface controller (NIC) to communicate data via a network (e.g., ETHERNET, 10baseT, 10base100, etc.). In the example of FIG. 1A, the control circuitry 112 communicates with the wire feeder 104 via the weld circuit via a communications transceiver 118, as described below.

In some examples, the selection tool may be displayed as graphical input devices on the color display screen 116. For example, the color display screen 116 may be a touch screen configured to receive inputs from a user via such graphical input devices that are displayed on the color display screen 116. For instance, instead of (or in addition to) actual physical input devices disposed on the user interface 114, in certain examples, other types of user input elements, such as graphical buttons, sliders, knobs, and so forth, displayed via the color display screen 116 may be used to receive inputs from a user. The selection tool shown in FIG. 2, for example, can serve as a display associated with a separate input (e.g., a remoter and/or physical selector) to provide a visual indicator of the selected welding parameters and associated limits.

The control circuitry 112 includes at least one controller or processor 120 that controls the operations of the power supply 102. The control circuitry 112 receives and processes multiple inputs associated with the performance and demands of the system 100. The processor 120 may include one or more microprocessors, such as one or more "general-purpose" microprocessors, one or more special-purpose microprocessors and/or ASICS, and/or any other type of processing device. For example, the processor 120 may include one or more digital signal processors (DSPs).

In some examples, the control circuitry 112 is configured to implement the limit setting features disclosed herein. For instance, the control circuitry 112 receives an input (e.g., from an operator input and/or data associated with a particular weld program, tool or type) associated with an upper limit and/or a lower limit for one or more welding command parameters. Based on the input, the control circuitry 112 can cause the upper limit value and the lower limit value to be stored in memory 124 and/or storage device 123 as instructions 125. In examples, a welding parameter value is selected (e.g., from an operator input and/or data associated with a particular weld program, tool or type) and a range within the limits is calculated by the control circuitry 112. The limits are then employed by the control circuitry 112 to control the power source to deliver power and/or the wire feeder to advance the electrode wire based on the calculated limits and the selected welding parameter value.

In some examples, the control circuitry 112 calculates a threshold amount (e.g., percentage, numerical value, etc.) within the calculated range. In response to a commanded value entering the threshold of one or more of the upper limit command value and the lower limit command value, an alert can be provided to the operator.

In some examples, once a range or ranges have been calculated for a particular welding parameter(s), the range(s) and corresponding upper and lower command value limit values can be designated (e.g., by the operator or a weld process) as a customized setting associated with a particular welding operation, tool, welder, etc., and can be designated with an identifier for easy look up. The customized setting can then be stored in memory (e.g., in storage device(s) 123 and/or the memory 124), which can be recalled via the interface 114 and/or displayed on display 116 for review and selection.

In some examples, the control circuitry 112 stores one or more welding program sequences, such as associated with a welding process type (e.g., metal inert gas (MIG) or a gas tungsten arc welding (GTAW) welding process, plasma cutting, etc.) in memory 124. As disclosed herein, each welding program sequence may contain one or more welding parameter values and associated ranges. In some examples, an input, such as from a user, can indicate the desired upper and/or lower limits for each welding parameter value of the selected welding program sequence, as disclosed herein. The control circuitry 112 can access the one or more welding program sequences in response to an input (e.g., from a weld operation sequence and/or an operator input). An input can be provided via user interface 114 and/or from a remote controller via network interface 117.

Lock indicator 233 can be used to set, activate or deactivate a lock mode for one or more of the selected upper and lower command value limits. Thus, an operator cannot manually adjust a welding parameter to exceed or fall below a selected upper or lower command value limit, respectively, nor could a welding schedule control a welding parameter to go outside the selected limits. The lock mode may be activated to lock all designated limits (e.g., both upper and lower command value limits for both a first and a second welding parameter), or may selectively lock one or more designated limits (e.g., one or more of the upper and lower command value limits for one or more of the first or second welding parameter). Thus, during a welding operation, the control circuitry maintains each welding parameter command value to operate in accordance with the one or more locked limits.

The example control circuitry 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device 123 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, deposition rate, wire feed speed, puddle fluidity, and so forth.

The memory device 124 may include a volatile memory, such as random access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124, along with code configured to provide a specific output (e.g., initiate wire feed, enable gas flow, capture welding related data, detect short circuit parameters, determine amount of spatter) during operation. One or more lists or look up tables may be provided, and/or network connections to various databases available to inform decision-making, such as to access preferred welding parameters, to store updated welding parameter settings, etc.

In some examples, the welding power flows from the power conversion circuitry 110 through a weld cable 126 to the wire feeder 104 and the welding torch 106. The example weld cable 126 is attachable and detachable from weld studs at each of the power supply 102 and the wire feeder 104 (e.g., to enable ease of replacement of the weld cable 126 in case of wear or damage). Furthermore, in some examples, welding data is provided with the weld cable 126 such that welding power and weld data are provided and transmitted together over the weld cable 126. The communications transceiver 118 is communicatively coupled to the weld cable 126 to communicate (e.g., send/receive) data over the weld cable 126. The communications transceiver 118 may be implemented using serial communications (e.g., full-duplex RS-232 or RS-422, or half-duplex RS-485), network communications (e.g., Ethernet, PROFIBUS, IEEE 802.1X wireless communications, etc.), parallel communications, and/or any other type of communications techniques. In some examples, the communications transceiver 118 may implement communications over the weld cable 126.

The example communications transceiver 118 includes a receiver circuit 121 and a transmitter circuit 122. Generally, the receiver circuit 121 receives data transmitted by the wire feeder 104 via the weld cable 126 and the transmitter circuit 122 transmits data to the wire feeder 104 via the weld cable 126. The communications transceiver 118 enables remote configuration of the power supply 102 from the location of the wire feeder 104, and/or command and/or control of the wire feed speed output by the wire feeder 104 and/or the weld power (e.g., voltage, current) output by the power supply 102. In some examples, the communications are transmitted via a dedicated cable between components and/or wireless communications channels, as well as other suitable communications devices and/or techniques.

The example wire feeder 104 also includes a communications transceiver 119, which may be similar or identical in construction and/or function as the communications transceiver 118. While communication over a separate communications cable is illustrated in FIG. 1A, other communication media, such as wireless media, power line communications, and/or any other communications media, may be used.

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the control circuitry 112 to enable, inhibit, or control gas flow (e.g., shielding gas) through the valve 130. Shielding gas exits the valve 130 and flows through a cable 132 (which in some implementations may be packaged with the welding power output) to the wire feeder 104, which provides the shielding gas to the welding application. In some examples, the welding system 100 does not include the gas supply 128, the valve 130, and/or the cable 132.

In some examples, the wire feeder 104 uses the welding power to power the various components in the wire feeder 104, such as to power a wire feeder controller 134. As noted above, the weld cable 126 may be configured to provide or supply the welding power. The power supply 102 may also communicate with a communications transceiver 119 of the wire feeder 104 using the weld cable 126 and the communications transceiver 118 disposed within the power supply 102. In some examples, the communications transceiver 119 is substantially similar to the communications transceiver 118 of the power supply 102. The wire feeder controller 134 controls the operations of the wire feeder 104. In some examples, the wire feeder 104 uses the wire feeder controller 134 to detect whether the wire feeder 104 is in communication with the power supply 102 and to detect a current welding process of the power supply 102 if the wire feeder 104 is in communication with the power supply 102.

In examples, the power supply 102 delivers a power output directly to torch 106 without employing any contactor. In such an example, power regulation is governed by the control circuitry 112 and/or the power conversion circuitry 110. In some examples, a contactor 135 (e.g., high amperage relay) is employed and controlled by the wire feeder controller 134 and configured to enable or inhibit welding power to continue to flow to the weld cable 126 for the welding application. In some examples, the contactor 135 is an electromechanical device. However, the contactor 135 may be any other suitable device, such as a solid-state device. The wire feeder 104 includes a wire drive 136 that receives control signals from the wire feeder controller 134 to drive rollers 138 that rotate to pull wire off a spool 140 of wire. The wire is provided to the welding application through a torch cable 142. Likewise, the wire feeder 104 may provide the shielding gas from the cable 132 through the cable 142. The electrode wire, the shield gas, and the power from the weld cable 126 are bundled together in a single torch cable 144 and/or individually provided to the welding torch 106. In some examples, the contactor 135 is omitted and output or welding-type power is initiated and stopped by the power supply 102 without employing a contactor 135. In some examples, one or more sensors 127 are included with or connected to in the wire feeder 102 to monitor one or more welding parameters (e.g., power, voltage, current, wire feed speed, etc.) to inform the wire feeder controller 134 during the welding process. In some examples, one or more sensors are included in the welding power supply 102.

The welding torch 106 delivers the wire, welding power, and/or shielding gas for a welding application. The welding torch 106 is used to establish a welding arc between the welding torch 106 and a workpiece 146. A work cable 148 couples the workpiece 146 to the power supply 102 (e.g., to the power conversion circuitry 110) to provide a return path for the weld current (e.g., as part of the weld circuit). The example work cable 148 is attachable and/or detachable from the power supply 102 for ease of replacement of the work cable 148. The work cable 148 may be terminated with a clamp 150 (or another power connecting device), which couples the power supply 102 to the workpiece 146. In some examples, one or more sensors 147 are included with or connected to the welding torch 106 to monitor one or more welding parameters (e.g., power, voltage, current, wire feed speed, etc.) to inform the wire feeder controller 134 and/or 112 during the welding process. Although illustrated with the torch 106 (e.g., a welding tool, as described herein) connecting through wire feeder 104, in some examples the welding tool can connect directly to the welding power supply 102. For instance, a gouging and/or cutting tool may connect directly to studs or another power outlet of the welding power supply 102. In some examples, a wire feeder is integrated with the power supply, and studs or other power outlets are provided on the housing of such an integrated enclosure.

Figure 1B:
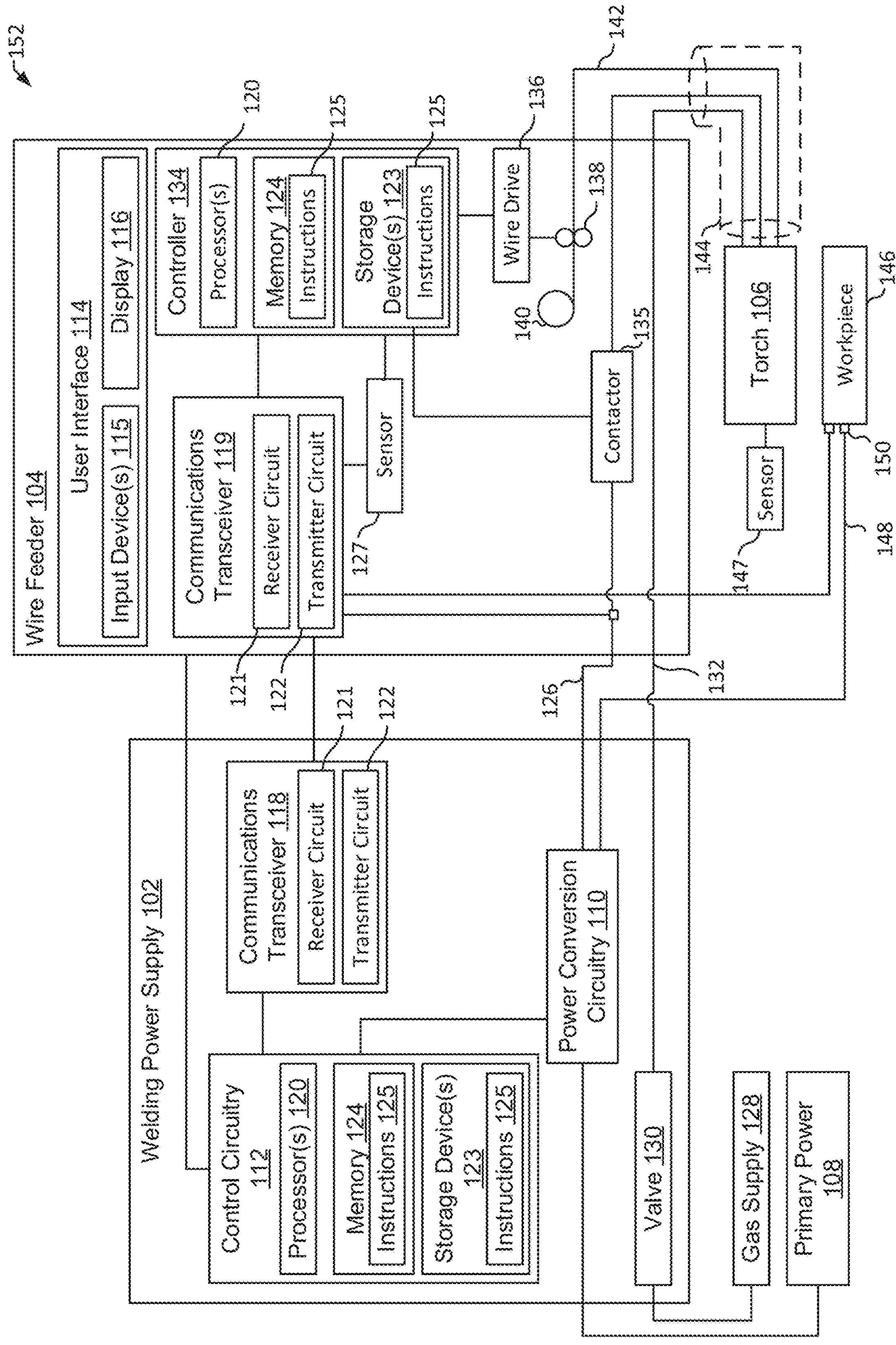
FIG. 1B is a schematic diagram of another example welding system including a wire feeder having a user interface to implement automatic control of welding parameter command value ranges, in accordance with aspects of this disclosure.

FIG. 1B is a schematic diagram of another example welding system 152 in which the wire feeder 104 includes the user interface 114 in addition or as an alternative to the user interface on the welding power supply 102. In the example of FIG. 1B, the control circuitry 134 of the wire feeder 104 implements the determinations of the welding program and welding parameters which are described with reference to the control circuitry 112 of FIG. 1A.

Figure 1C:
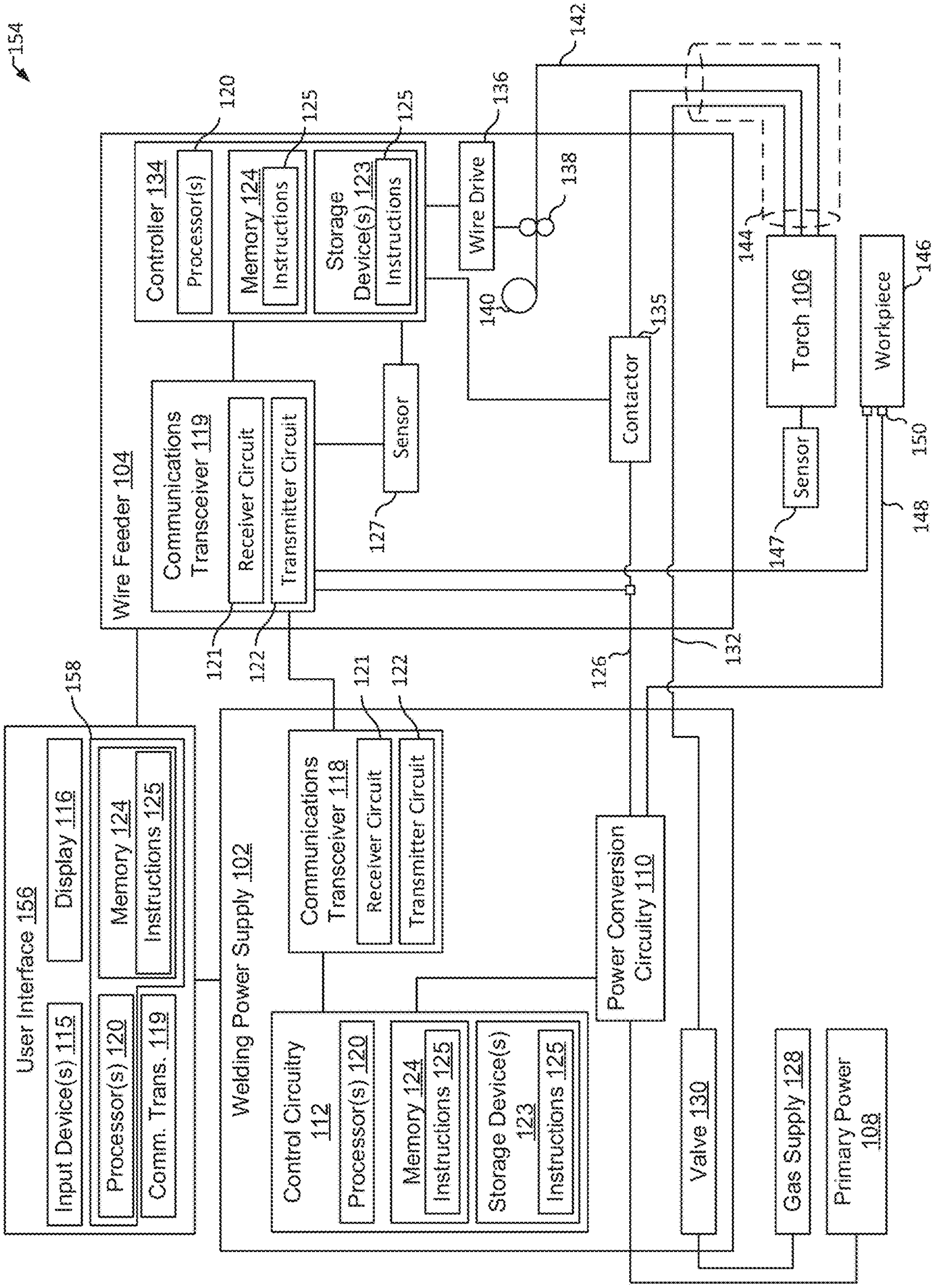
FIG. 1C is a schematic diagram of another example welding system including a user interface connected to a welding power supply and/or a wire feeder to implement automatic control of welding parameter command value ranges, in accordance with aspects of this disclosure.

FIG. 1C is a schematic diagram of another example welding system 154 including a separate user interface 156. The user interface 156 is a separate device, and may be connected to the welding power supply 102 and/or to the wire feeder 104 to provide commands and/or control information. The example user interface 156 includes the input devices 115 and the display 116, and includes control circuitry 158. The example control circuitry 158 includes the processor(s) 120 and the memory 124 storing the instructions 125. The example user interface 156 further includes a communications transceiver 119 to enable communications between the user interface 156 and the welding power supply 102 and/or the wire feeder.

Although FIGS. 1A-1C are illustrated as having a user interface (114, 156) incorporated with a particular system, the illustration is exemplary such that one or more of the interfaces disclosed herein as well as additional user interfaces may be incorporated in one or more of the example welding systems disclosed herein. Furthermore, although power supply 102 and wire feeder 104 are illustrated as independent units, in some examples, the power supply and wire feeder can be housed in a single enclosure or otherwise integrated. Additionally or alternatively, a single controller, control circuitry, and/or interface can control operation of both the power supply and wire feeder, in some examples.

Figure 2:
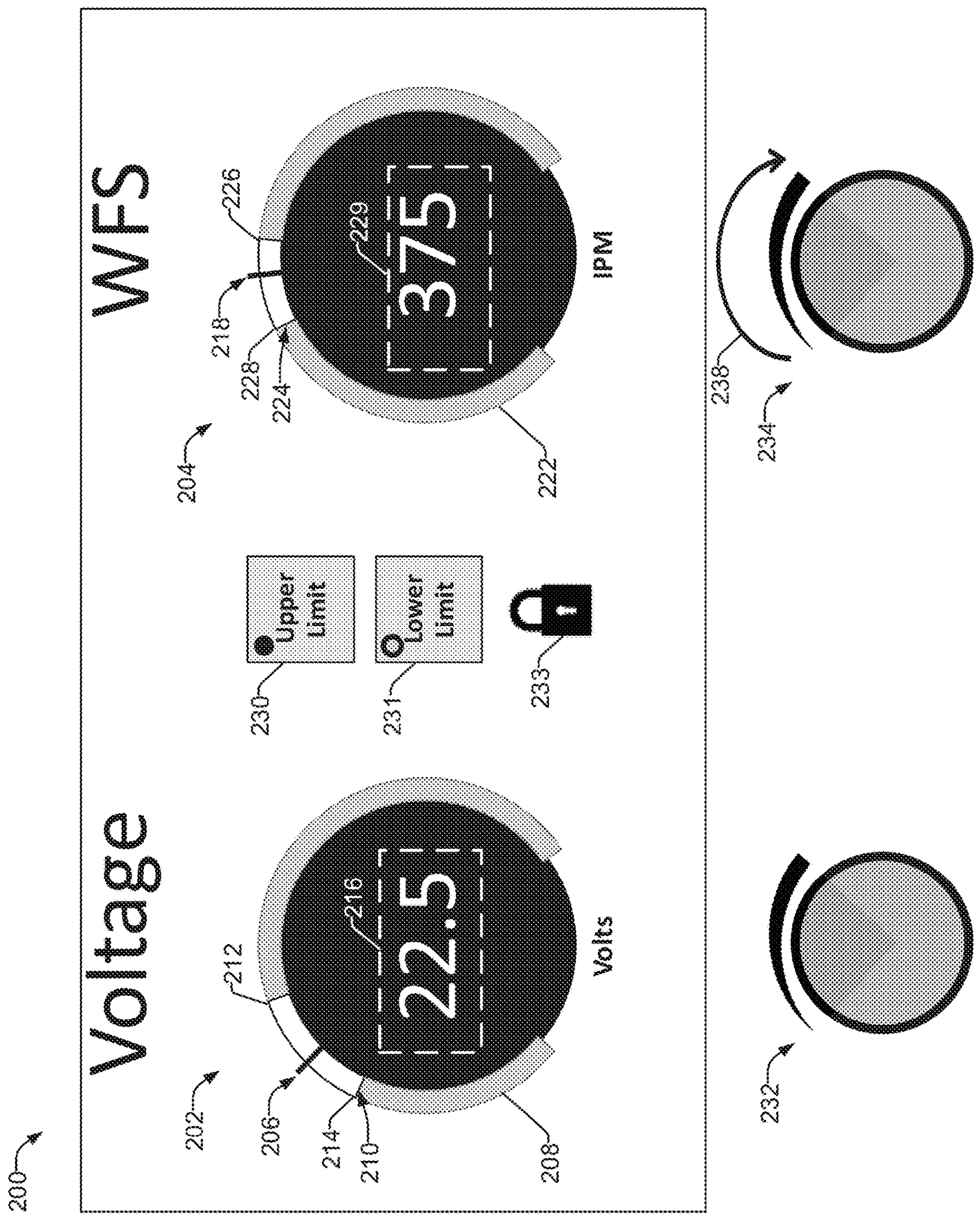
FIG. 2 provides an example graphical user interface displaying welding parameter command value limits, in accordance with aspects of this disclosure.

FIG. 2 illustrates an example graphical user interface 200 that may be used to implement the graphical user interface (s) 114, 156 of FIGS. 1A-1C. The graphical user interface 200 of FIG. 2 includes one or more graphical interfaces 202 and 204, an upper limit indicator 230, a lower limit indicator 231, a lock indicator 233, and/or one or more selectors 232 and 234 to allow a user to configure one or more welding parameters for a selected weld process. The graphical user interface 200 may include more or fewer of the example graphical interfaces 202, 204 illustrated in FIG. 2. In some examples, the upper limit indicator 230, the lower limit indicator 231, and/or the lock indicator 233 are operable as selection devices (e.g., buttons, membrane panel switches, touch enabled screen icons, etc.), such that they can be used to set, activate, and/or deactivate an upper limit, a lower limit, or a lock mode, respectively. In some examples, one or more menu driven selection devices (e.g., via a welding power supply and/or computing platform providing a user interface from which to modify and/or select a menu or menu item) can be employed in addition to or in the alternative to a manual selection technique. For instance, the computing platform may be connected to the control device (e.g., welding power supply and/or auxiliary device) via a wired or wireless connection (e.g., through a network), such that command value limits may be modified and/or selected by use of a menu enabled device and/or software.

During a selection, the device may require one or more actions associated with a given result. Thus, in order to set a value, the device is depressed for multiple seconds; to activate a lock, the device is tapped twice in rapid succession; to deactivate, two buttons are pressed simultaneously; etc. The graphical interface corresponding to the welding parameter being controlled may provide a visual or audible indication during selection (e.g., a change in color, animation, etc.). Once the selection is complete, another indication may be provided indicating a selection was successful, unsuccessful, or that another action is required, for example.

In some examples, the upper limit indicator 230 can reflect the upper limit being set for one or more parameters (e.g., represented in the one or more graphical interfaces 202 and 204). Similarly, a lower limit indicator 231 can reflect the lower limit value. The lock indicator 233 is an interface that provides visual information regarding the lock mode. Further, the lock indicator 233 may serve as a selection device for setting, activating or deactivating the lock mode.

When the locks of the selected limits is enabled, the lock indicator 233 can display a particular characteristic to clearly indicate the locked status (e.g., display a red color, become illuminated, animate, etc.). When locks and limits are activated, the operational range of the corresponding welding parameter may also display a particular characteristic to indicate the range of command values is locked (e.g., display a red color). In some examples, the first welding parameter is a voltage, and can operate within a range of 10-45 Volts, and the second welding parameter is a wire speed range, which operates within a range of 50-700 inches per minute (IPM). Additionally or alternatively, the complete available adjustment range for each welding parameter (e.g., the limits of the welding component output capacity) can be shown on each graphical display with a different characteristic (e.g., a green color, different intensity, etc.). When lock and limits are activated, the actual parameter limit can be shown near the top and bottom of the allowable parameter adjustment range.

The graphical user interface 200 includes a first graphical interface 202 representing a first welding parameter, such as voltage. A second graphical interface 204 represents a second welding parameter, such as wire feed speed. Each graphical interface 202 and 204 may be controlled by a controller, such as control circuitry 112, controller 134, and/or controller 158, responsive to selectors 232 and 234, for example.

Each graphical interface 202 and 204 includes a marker 206, 209 representing the output value associated with the respective welding parameter (e.g., voltage or wire feed speed). During a welding process, each graphical interface 202 and 204 may display a numerical value 216, 229 corresponding to the welding system output of the particular welding parameter, such as measured from one or more sensors. In some examples, the numerical values 216, 229 represent an estimated or calculated value.

Each graphical interface 202 and 204 includes a graphical operating range 208, 222 representing the full operating range of output values for the particular welding parameter (e.g., based on the particular welding power source). Within each operating range is a graphical band 210, 224 providing a visual representation of the operating range bounded by the upper 212, 226 and lower 214, 228 command value limits for the particular welding parameter. In some examples, the numerical value of the upper 212, 226 and lower 214, 228 limits may be displayed.

The graphical bands 210, 224 represent a range of operating values associated with a particular material property and/or welding process parameter (e.g., voltage, current, power, wire feed speed, gas flow rate, pulse rate, workpiece thickness, workpiece material type, electrode type, welding process, travel speed, arc length, arc control, or joint type). In the example of graphical interface 202, graphical band 210 represents a range of command values spanning a low voltage value to a high voltage value corresponding to the upper 212 and lower 214 command value limits. In the example of FIG. 2, marker 206 (representing approximately 22.5 volts as shown in central block 216) is approximately centered on the graphical band 210 between lower portion 214 and higher portion 212, however marker 206 (as well as marker 218) reflect the output value, which is independent of the selected upper or lower limits. In graphical interface 204 shows marker 218, corresponding to the wire feed speed value shown in central block 229, is positioned within graphical band 224 slightly right of center, thus at a location closer to upper limit 226 of the graphical band 224 (e.g., associated with a higher wire feed speed, rather than lower limit 228 (e.g., associated with a lower wire feed speed).

As shown, portions 214, 228 represent a lower limit command value for the respective welding parameters. Portions 212, 226, represent upper limit command values for the respective welding parameters. Additionally or alternatively, values may be displayed to provide a numerical indicator as to the command limits of the operative range. Further, within each graphical band, the range of command values may be represented by colors, for instance, with lower or cooler values corresponding to blue and higher or hotter values corresponding to red.

In some examples, the GUI displays the graphical bands with different characteristics, such that the presentation is easily discernable as to which value and/or range is associated with the upper and/or lower limit. For instance, a graphical operating range corresponding to the operating range of the respective welding parameter can be displayed with a first characteristic, wherein portions of the graphical operating range outside the respective graphical band are displayed with a second characteristic. Each graphical interface and/or band can incorporate one or more characteristics, such as a color, an intensity, a shape, a size, or a pattern.

Once selected, the upper and lower command limit values of the respective welding parameters and the corresponding range of values can be stored in a memory storage device. The values can be stored in a list of values, which can be accessed for future reference and/or analysis.

In some examples, the control circuitry can control the welding system component to accept a respective command value input within the corresponding range of command values when the lock mode is activated. Additionally or alternatively, the control circuitry can generate an alert when a commanded value comes within a threshold level (e.g., within a percentage value and/or a numerical value) of the upper limit command value or the lower limit command value for a respective welding parameter. In some examples, if the commanded values are within the threshold or exceed the target command value limits, the controller may control the relative device (e.g., welding power supply, wire feeder, etc.) to adjust the value of the particular welding parameter to fall within the selected range.

In some examples, a welding program or sequence can be implemented (e.g., from memory and/or a remote control such as via a menu selection), which provides a schedule of upper and/or lower limit command values for one or more welding parameters to the control circuitry, which can be automatically set and presented on the GUI. In some examples, a given welding program can provide upper and/or lower limits for each welding parameter, such that the control circuitry controls the system output based on the selected welding parameter limit command values. Based on the given welding program, an operating range can be calculated for one or more of the applicable welding parameters (e.g., based on the upper and lower command value limit values for each welding parameter, as disclosed herein), and the control circuitry controls the power source to deliver power (or, in some welding operations, for the welding wire feeder to advance the electrode wire) based on the calculated operating range for the applicable welding parameters.

In some examples, the welding system(s) 100, 152, 154 may implement a synergic mode, in which the control circuitry 112, controller 134, and/or controller 158, receives a selection for an upper and a lower value limit for a first welding parameter value (e.g., via an interface and/or from a programmed weld sequence), and calculates upper and lower command value limits for a second welding parameter value based on a predetermined relationship between the first welding parameter and the second welding parameter. In some examples, the predetermined relationship corresponds to the selected weld sequence program or a user identified relationship. The control circuitry/controller may enable or disable the synergic mode based on the selected weld sequence program (e.g., based on a selection of synergic weld process or a non-synergic weld process).

In some examples, more or fewer applicable welding parameters are provided, and/or selectable from a list of welding parameters.

Figure 3:
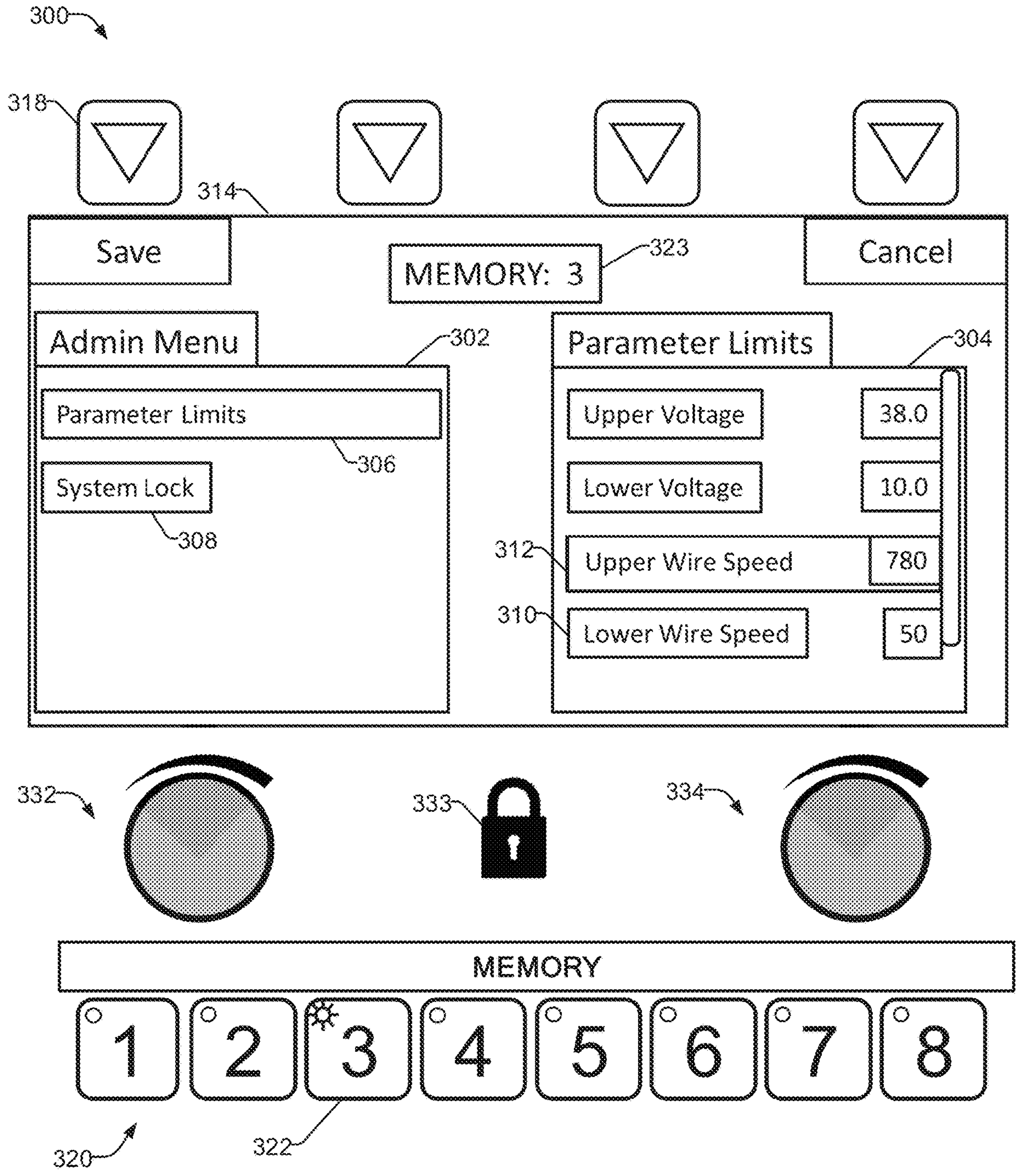
FIG. 3 provides another example graphical user interface displaying welding parameter command value limits, in accordance with aspects of this disclosure.

FIG. 3 illustrates another example graphical user interface 300 that may be used to implement the graphical user interface(s) 114, 156 of FIGS. 1A-1C. In the example of FIG. 3, one or more menu driven selection devices (e.g., via a welding power supply and/or computing platform providing a user interface from which to modify and/or select a menu or menu item) can be employed in addition to or in the alternative to a manual selection technique. For instance, the computing platform may be connected to the control device (e.g., welding power supply and/or auxiliary device) via a wired or wireless connection (e.g., through a network), such that command value limits may be modified and/or selected by use of a menu enabled device and/or software. A number of selection devices are provided to scroll, select, and/or otherwise adjust menu items and/or values, including selection devices 318, memory preset selectors 320, a lock indicator 333, and/or one or more selectors 332 and 334 to allow a user to scroll through one or more menus and/or menu options provided on a screen or display 314, and to select and/or adjust a welding parameter and/or value thereof.

As shown in FIG. 3, the graphical user interface 300 includes one or more menus, such as Admin Menu 302 and/or Parameter Limits menu 304, however, a variety of menus associated with welding systems and/or auxiliary devices may be provided that are not explicitly illustrated. In the illustrated example, memory icon 322 is selected from memory preset selectors 320, which is reflected in icon 323 of the graphical user interface 300.

Admin Menu 302 may include a number of selection devices, including parameter limits 306 and/or system lock 308, for instance. Selector 332 may be used to scroll through and/or select an item listed in Admin Menu 302, such as Parameter Limits 306. Once selected, the Parameter Limits menu 304 provides a listing of parameters available for setting limits (e.g., upper and lower limits for voltage, wire feed speed, etc.). Selector 334 may be used to scroll through and/or select an item listed in Parameter Limits menu 304. As shown, a menu item representing Upper Wire Speed 312 is selected, such that the value may be adjusted.

In some examples, the lock indicator 333 is operable as a selection device (e.g., buttons, membrane panel switches, touch enabled screen icons, etc.), such that it can be used to set, activate, and/or deactivate a lock mode. In examples, following a selection, the screen 314 may transition to one or more various displays, such as shown in the GUI 200 of example FIG. 2.

Figure 4:
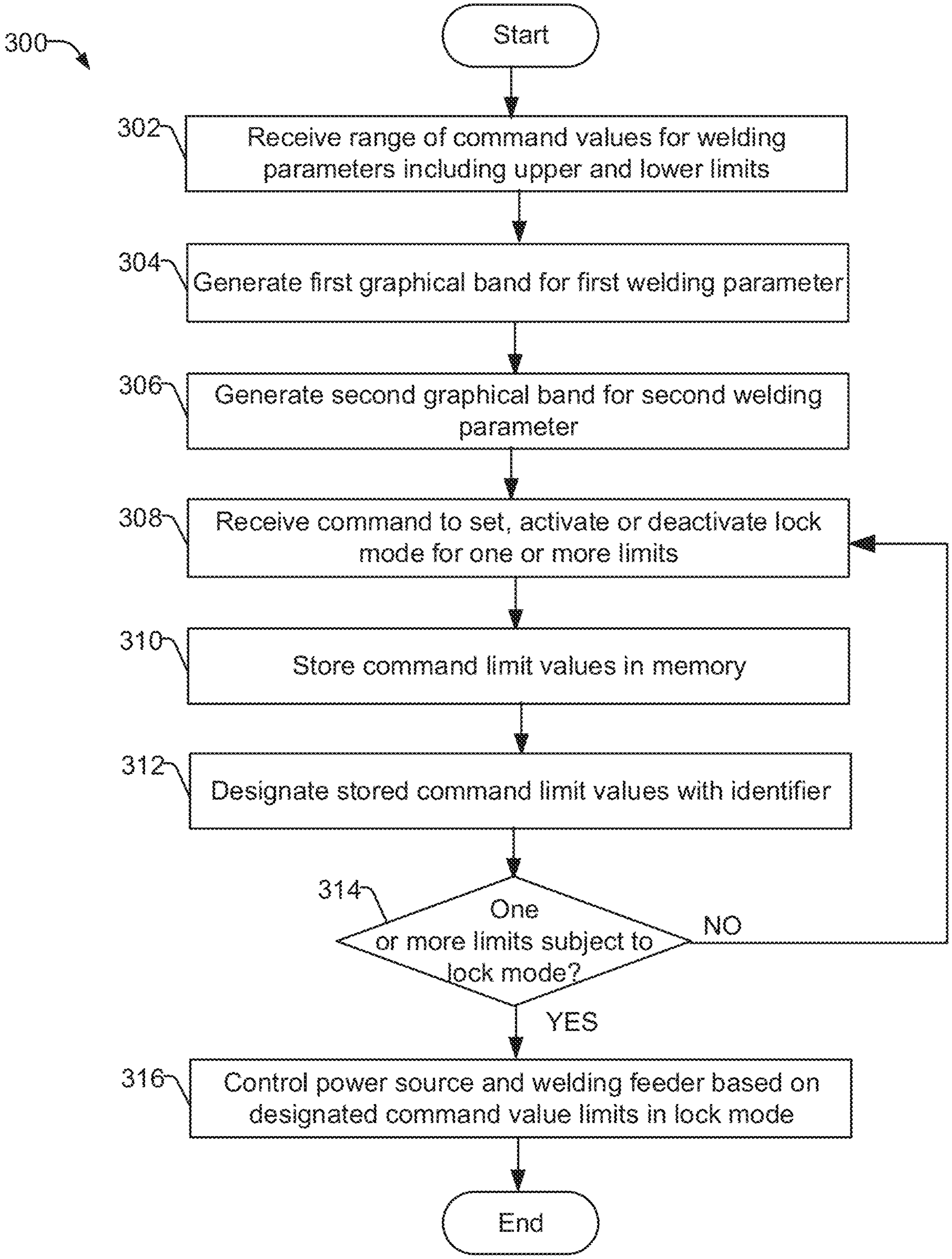
FIG. 4 provides a flowchart representative of example machine-readable instructions that may be executed by the example system of FIGS. 1A-1C to implement limit value selection for welding parameters of a welding process, in accordance with aspects of this disclosure.

FIG. 4 provides a flowchart representative of example machine readable instructions 300 which may be executed by the example welding system 100 of FIG. 1A, the example welding system 152 of FIG. 1B, and/or the example welding system 154 of FIG. 1C, to input and/or receive upper and lower command value limits for a plurality of welding parameters. The example instructions 300 may be stored in the storage device(s) 123 and/or the memory 124 and executed by the processor(s) 120 of the control circuitry 112. The example instructions 300 are described below with reference to the systems of FIGS. 1A through 2.

In block 302, a control circuitry (e.g., control circuitry 112, 152, 154), receives data (e.g., via one or more selection tools, such as a user interface 114, memory 124, a remote computer via network interface 117, of FIGS. 1A-2) corresponding to a range of command values for one of a first or second welding parameter of one or more welding parameters (e.g., voltage, current, power, wire feed speed, gas flow rate, pulse rate, workpiece thickness, workpiece material type, electrode type, welding process, travel speed, arc length, arc control, or joint type). In examples, each range of command values having an upper limit or a lower limit.

In block 304, the control circuitry generates a first graphical band representing the range of command values for the first welding parameter on a graphical user interface (GUI) (e.g., GUI 200). In block 306, the control circuitry generates a second graphical band representing the range of command values for the second welding parameter.

In block 308, the control circuitry receives commands (e.g., via one or more selection tools) corresponding to setting, activating or deactivating the lock mode for the upper or lower limit values of the first or second welding parameter.

In block 310, the control circuitry can optionally store the limits in memory. In some examples, the limits are designated with an identifier in block 312, for example, as a list of upper and lower command value limits which can be accessed, scrolled through, and selected according to their identifier, allowing for easy recall and employment of stored limits (e.g., via an interface and/or selection tool).

In block 314, the control circuitry determines whether the selected upper and/or lower limits for the first or second welding parameters are subject to a lock mode. For example, each upper limit and lower limit are configured to be activated or deactivated independently.

In block 316, if the limits are subject to the lock mode, the limits are then employed by the control circuitry to control the power source to deliver power and/or the wire feeder to advance the electrode wire based on the calculated limits and the selected welding parameter value when in a lock mode. However, if the limits are not subject to the lock mode, the process returns to block 308 to receive additional commands.

Figure 5:
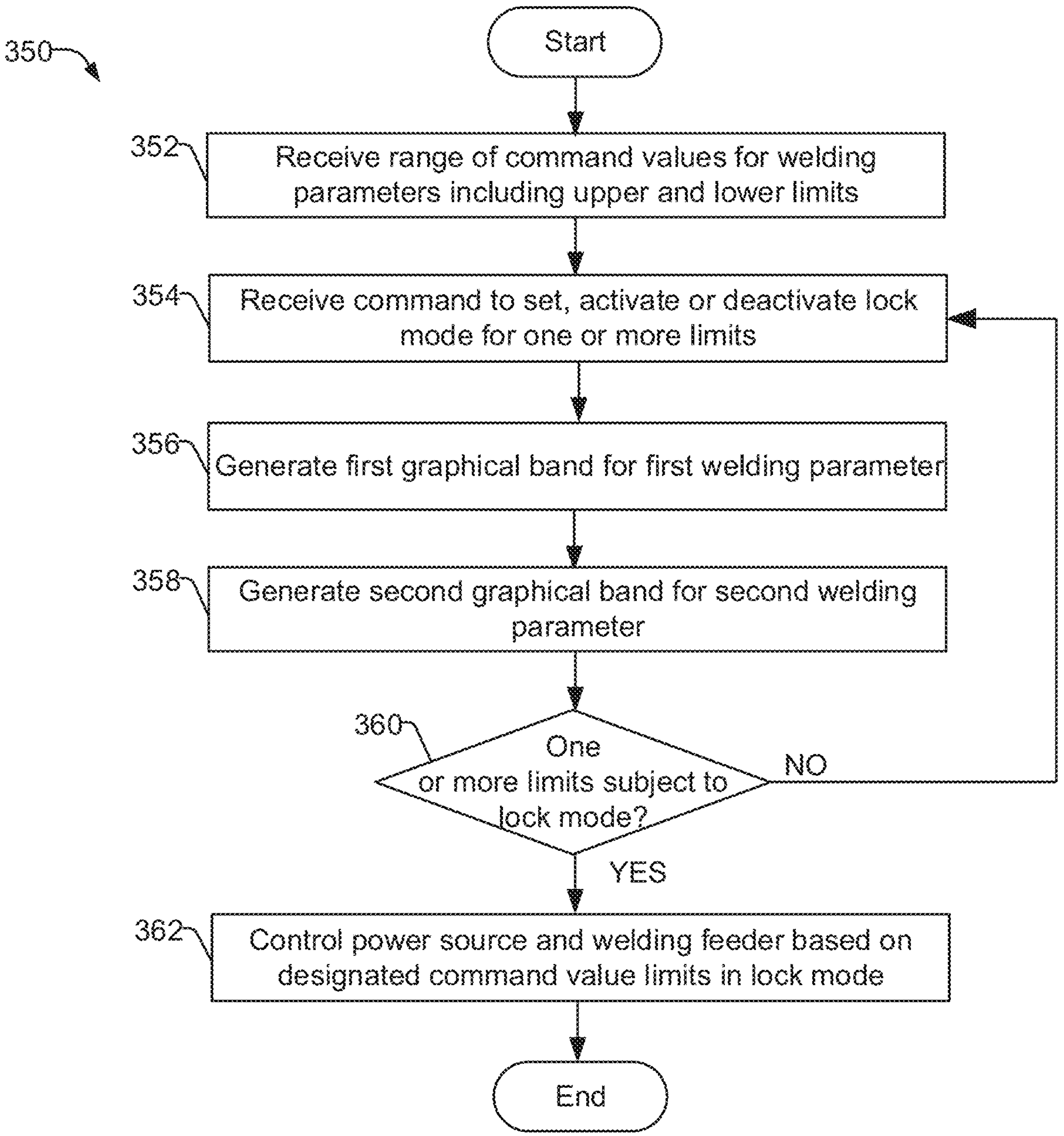
FIG. 5 provides another flowchart representative of example machine-readable instructions that may be executed by the example system of FIGS. 1A-1C to implement limit value selection for welding parameters of a welding process, in accordance with aspects of this disclosure.

FIG. 5 provides a flowchart representative of example machine readable instructions 350 which may be executed by the example welding system 100 of FIG. 1A, the example welding system 152 of FIG. 1B, and/or the example welding system 154 of FIG. 1C, to input and/or receive upper and lower command value limits for a plurality of welding parameters. The example instructions 300 may be stored in the storage device(s) 123 and/or the memory 124 and executed by the processor(s) 120 of the control circuitry 112. The example instructions 300 are described below with reference to the systems of FIGS. 1A through 2.

In block 352, a control circuitry (e.g., control circuitry 112, 152, 154), receives data (e.g., via one or more selection tools, such as a user interface 114, memory 124, a remote computer via network interface 117, of FIGS. 1A-2) corresponding to a range of command values for one of a first or second welding parameter of one or more welding parameters (e.g., voltage, current, power, wire feed speed, gas flow rate, pulse rate, workpiece thickness, workpiece material type, electrode type, welding process, travel speed, arc length, arc control, or joint type). In examples, each range of command values having an upper limit or a lower limit.

In block 354, the control circuitry receives commands (e.g., via one or more selection tools) corresponding to setting, activating or deactivating the lock mode for the upper or lower limit values of the first or second welding parameter.

In block 356, the control circuitry generates a first graphical band representing the range of command values for the first welding parameter. For instance, the control circuitry displays a first characteristic on the first or second graphical band.

In block 358, the control circuitry generates a second graphical band representing the range of command values for the second welding parameter. For instance, the control circuitry displays a graphical operating range corresponding to the operating range of the respective welding parameter, wherein portions of the graphical operating range outside the respective graphical band is displayed with a second characteristic.

In block 360, the control circuitry determines whether the selected upper and/or lower limits for the first or second welding parameters are subject to a lock mode. For example, each upper limit and lower limit are configured to be activated or deactivated independently.

In block 362, the limits are then employed by the control circuitry to control the power source to deliver power and/or the wire feeder to advance the electrode wire based on the calculated limits and the selected welding parameter value when in a lock mode.

The presented devices and/or methods may be realized in hardware, software, or a combination of hardware and software. The presented methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power supply with a program or other code that, when being loaded and executed, controls the welding power supply such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine-readable storage media and to exclude propagating signals.

The control circuitry may identify welding conditions of a given weld and automatically find the optimum value of one or more welding parameters for the welding conditions. An example control circuit implementation may be an Atmel Mega16 microcontroller, a STM32F407 microcontroller, a field programmable logic circuit and/or any other control or logic circuit capable of executing instructions that executes weld control software. The control circuit could also be implemented in analog circuits and/or a combination of digital and analog circuitry. Examples are described herein with reference to various types of welders, but may be used or modified for use in any type of high frequency switching power source.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type system comprising:

a welding-type power supply;

a graphical user interface (GUI) that includes a graphical interface representing a welding parameter; and a control circuitry configured to:

receive data corresponding to a range of command values for the welding parameter, the range of command values having an upper limit or a lower limit;

generate a graphical band representing the range of command values for the welding parameter, the range of command values bounded by the upper limit and the lower limit, wherein a size of the graphical band is based on the upper limit and the lower limit;

display the graphical band on the GUI;

display a full operating range on the GUI, wherein the full operating range represents the full range of values for the welding parameter, wherein the full operating range is greater than a difference between the upper limit and the lower limit; and control the welding-type power supply to maintain a command value within the range of command values when in a lock mode.

2. The system of claim 1, further comprising a user interface to set, activate or deactivate the upper limit or the lower limit value associated with the graphical band of the welding parameter.

3. The system of claim 1, further comprising a user interface to set, activate or deactivate the lock mode for the welding parameter.

4. The system of claim 1, wherein the lock mode corresponds to the upper limit or the lower limit for the range of command values corresponding to the welding parameter, wherein each respective upper limit and lower limit values are configured to be activated or deactivated independently.

5. The system of claim 1, wherein the control circuitry further configured to:

receive one or more particular welding parameters; and calculate an upper limit or a lower limit value of the welding parameter based on one of the particular welding parameters.

6. The system of claim 1, wherein the control circuitry is further configured to display values corresponding to the upper limit or the lower limit of the range of command values for the welding parameter.

7. The system of claim 6, wherein the control circuitry is further configured to generate an alert when the command value comes within a threshold level of the upper limit or the lower limit for the welding parameter.

8. The system of claim 1, further comprising a user interface to adjust the range of command values for the welding parameter.

9. The system of claim 8, further comprising a user interface comprising a selector knob or a touch screen.

10. The system of claim 1, further comprising a user interface to set, activate or deactivate the upper limit or the lower limit associated with the range of command values of the welding parameter.

11. A welding-type system comprising:

a welding-type power supply;

a graphical user interface (GUI) that includes a first graphical interface representing a first welding parameter, and a second graphical interface representing a second welding parameter; and a control circuitry configured to:

receive data corresponding to an upper command value limit or a lower command value limit associated with the first welding parameter or the second welding parameter;

receive, via a user interface, a command to activate or deactivate a lock mode for the upper command value limit or the lower command value limit for the first or second welding parameter;

generate a first graphical band representing a range of command values for the first welding parameter between the corresponding upper and lower command value limits, wherein a shape of the first graphical band changes based on the corresponding upper and lower command value limits;

generate a second graphical band representing a range of command values for the second welding parameter between the corresponding upper and lower command value limits; and control the welding-type power supply to maintain the first command value or the second command value within the respective range of command values when in the lock mode.

12. The system of claim 11, wherein the control circuitry is further configured to:

receive data from one or more sensors corresponding to first and second command values for each of the first and second welding parameters, respectively;

display a first marker on the first graphical interface representing the first command value; and display a second marker on the second graphical interface representing the second command value.

13. The system of claim 12, wherein each graphical interface further comprises a numerical value corresponding to the first and second command values.

14. The system of claim 11, wherein the first welding parameter is one or more of a voltage or arc length.

15. The system of claim 11, wherein the second welding parameter is one or more of a wire feed speed or amperage.

16. The system of claim 11, wherein the control circuitry is further configured to display a first characteristic on the first or second graphical band.

17. The system of claim 16, wherein portions of each graphical interface displays a graphical operating range corresponding to the operating range of the respective welding parameter, wherein portions of the graphical operating range outside the respective graphical band is displayed with a second characteristic.

18. The system of claim 17, wherein the first or second characteristic comprises one of a color, an intensity, a shape, a size, or a pattern.

19. The system of claim 18, wherein the first characteristic is a first color and the second characteristic is a second color.

20. A welding-type system comprising:

a welding-type power supply;

a graphical user interface (GUI) that includes a first graphical interface representing a first welding parameter, and a second graphical interface representing a second welding parameter; and a control circuitry configured to:

receive, via a menu driven selection device, data corresponding to an upper command value limit or a lower command value limit associated with the first welding parameter or the second welding parameter;

receive, via the menu driven selection device, a command to activate or deactivate a lock mode for the upper command value limit or the lower command value limit for the first or second welding parameter;

generate a first graphical band representing a range of command values for the first welding parameter between the corresponding upper and lower command value limits, wherein a shape of the first graphical band changes based on the corresponding upper and lower command value limits;

generate a second graphical band representing a range of command values for the second welding parameter between the corresponding upper and lower command value limits; and control the welding-type power supply to maintain the first command value or the second command value within the respective range of command values when in the lock mode.

* * * * *